United States Patent [19]

Sakane et al.

[11] Patent Number: 5,070,742
[45] Date of Patent: Dec. 10, 1991

[54] STEERING WHEEL

[75] Inventors: Katsunobu Sakane, Ichinomiya; Mikio Kozakai, Owariasahi, both of Japan

[73] Assignee: Toyoda Gosei Co., Ltd., Nishikasugai, Japan

[21] Appl. No.: 646,525

[22] Filed: Jan. 25, 1991

Related U.S. Application Data

[63] Continuation of Ser. No. 336,813, Apr. 12, 1989, abandoned.

[30] Foreign Application Priority Data

Apr. 26, 1988 [JP] Japan .................. 63-103162

[51] Int. Cl.⁵ .............................................. B62D 1/04
[52] U.S. Cl. ....................................... 74/552; 74/558
[58] Field of Search ................ 74/552, 558; 29/159 B

[56] References Cited

U.S. PATENT DOCUMENTS

| | | | |
|---|---|---|---|
| 3,440,897 | 9/1967 | Dutt et al. | 74/552 |
| 4,118,455 | 10/1978 | Byrn | 74/552 |
| 4,179,950 | 12/1979 | Valley | 74/552 |
| 4,598,002 | 7/1986 | Kimura | 74/552 |
| 4,606,240 | 8/1986 | Sakane | 74/552 |
| 4,635,500 | 1/1987 | Overcashier et al. | 74/552 |
| 4,729,416 | 3/1988 | Miller | 74/558 |
| 4,753,129 | 6/1988 | Ishida et al. | 74/552 |
| 4,808,776 | 2/1989 | Niwa et al. | 200/61.55 |
| 4,872,364 | 10/1989 | Kaga et al. | 74/484 H |
| 4,876,915 | 10/1989 | Iuchi | 74/552 |

FOREIGN PATENT DOCUMENTS

| | | | |
|---|---|---|---|
| 0026673 | 2/1983 | Japan | 74/552 |
| 0063573 | 4/1983 | Japan | 74/552 |
| 58-44056 | 10/1983 | Japan | |
| 60-27723 | 8/1985 | Japan | |
| 0258859 | 11/1987 | Japan | 74/552 |

Primary Examiner—Allan D. Herrmann
Assistant Examiner—Winnie Yip
Attorney, Agent, or Firm—Cushman, Darby & Cushman

[57] ABSTRACT

A steering wheel comprises a steering wheel core having a ring core piece, a boss disposed downwardly of the center of the ring core piece and spoke core pieces, extending upwardly from the boss in the radial outer directions, for connecting the ring core piece to the boss. Provided at the ends of spoke core pieces extending from the boss are connecting parts, each formed of die casting metal, for connecting the spoke core pieces to ring core piece. A plurality of ribs formed integrally with the connecting parts are protruded from the upper surfaces of the connecting parts on the side of spoke core pieces. A pad, the upper surface of which is made substantially horizontal, is stretched over the boss to vicinal portions to the connecting parts. The surfaces of ring core piece and also of connecting parts including the ribs are covered with coating layers formed of synthetic resin by the injection molding. Each layer is arranged to have a substantially horizontal upper surface so that the upper surfaces of connecting parts are flush with the upper surface of pad.

6 Claims, 5 Drawing Sheets

STEERING WHEEL

BACKGROUND OF THE INVENTION

1. Field of the Invention

The present invention is directed to a steering wheel for use with an automobile.

2. Description of the Prior Art

A conventional steering wheel is typically composed of a boss, spoke core pieces extending outwardly from the boss in the radial outer directions, and end portions for connecting the spoke core pieces to a ring core piece, whereby the circumference of each end portions on the side of the spoke core piece is covered with a synthetic resin layer formed by an injection molding process (including reaction injection molding) to extend from the surface of ring core piece.

With respect to the upper surfaces of the end portions on the side of the spoke core pieces, the spoke core pieces are inclined downwards from the ring core piece to the boss. The coating layers covering the upper surfaces of the end portions on the side of the spoke core pieces are thickened with approach to the boss while making their upper surfaces substantially horizontal with a view to obtaining integral appearance with respect to the upper surface of a pad disposed upwardly of the boss.

The thickenings of coating layers on the upper surfaces of connecting parts on the side of the spoke core pieces tend to cause such drawbacks to the coating layers as weld marks or sink marks after the molding process has been effected. For the purpose of preventing the weld or sink marks, as disclosed in Japanese Utility Model Publication Nos. 44056/1983 and 27723/1985, the inserts formed of synthetic resing are set beforehand in the end portions to reduce the thickness of every coating layer itself.

However, the information of coating layers by singly setting the inserts in the end portions before performing the molding process involves a good number of steps and also presents a problem of being costly.

SUMMARY OF THE INVENTION

It is a primary object of the present invention which is made under such circumstances to provide a steering wheel capable of preventing weld marks and sink marks from appearing in coating layers and restraining an increase in cost without requiring much labour, even in a case where the synthetic resin coating layers are formed thick by an injection molding process on the upper surfaces of end portions, on the side of spoke core pieces, for connecting these spoke core pieces to a ring core piece.

To this end, according to one aspect of the invention, there is provided a steering wheel, comprising: a steering wheel core having a ring core piece, a boss disposed downwardly of the center of the ring core piece; spoke core pieces, extending upwards from the boss in the radial outer directions, for connecting the ring core piece to the boss; end portions formed of die casting metal and provided at the ends of the spoke core pieces extending from the boss, for connecting the spoke core pieces to the ring core piece; a plurality of ribs, disposed on the upper surfaces of spoke core pieces at the end portions and so formed integrally with the end portions as to project upwards; a pad stretched over the boss to vicinal portions to the end portions, with the pad upper surfaces made substantially horizontal; and a synthetic resin coating layer, formed to have a substantially horizontal surface by an injection molding process so that the upper surface thereof at the end portion is flush with the pad upper surface, for covering the surfaces of ring core piece and also of end portions including the ribs.

Based on such a constitution of the steering wheel according to the present invention, the plurality of ribs are protruded from the surfaces of spoke core pieces at the end portions between the spoke core pieces and the ring core piece. For this reason, in accordance with the present invention, where the steering wheel is manufactured by forming the coating layers on the steering wheel core, the ribs function to regulate shrinkage after forming the synthetic resin layers on the upper surfaces of the end portions on the side of spoke core pieces and also restrain the occurrence of sink and weld marks in the coating layers.

These ribs are protruded in continuation from the end portions formed of die casting metal for connecting the ends of spoke core pieces to the ring core piece. It is therefore unnecessary to provide the ribs specially when forming the covering layers, but they can be shaped without much labour simultaneously when manufacturing the steering wheel core itself. Some of the ribs, which are formed along the spoke core pieces in their longitudinal directions, can be shaped with no such drawbacks as cavities, because the molten die casting metal flows in the longitudinal directions at the end portions in close proximity to the spoke core pieces, which facilitates the flowage within recesses, dedicated to forming the ribs, of a molding die.

Hence, the steering wheel according to the present invention is capable of preventing the generation of weld and sink marks in the coating layers while restraining an increase in cost and eliminating the necessity for much labour, even in a case where the synthetic resin coating layers are formed thick by the injection molding process on the upper surfaces of the end portions, on the side of spoke core pieces, between the spoke core pieces and the ring core piece.

BRIEF DESCRIPTION OF THE DRAWINGS

Other objects and advantages of the invention will become apparent during the following discussion in conjunction with the accompanying drawing, in which.

DESCRIPTION OF THE PREFERRED EMBODIMENTS

Illustrative preferred embodiments of the present invention will hereinafter be described.

Figure 1:
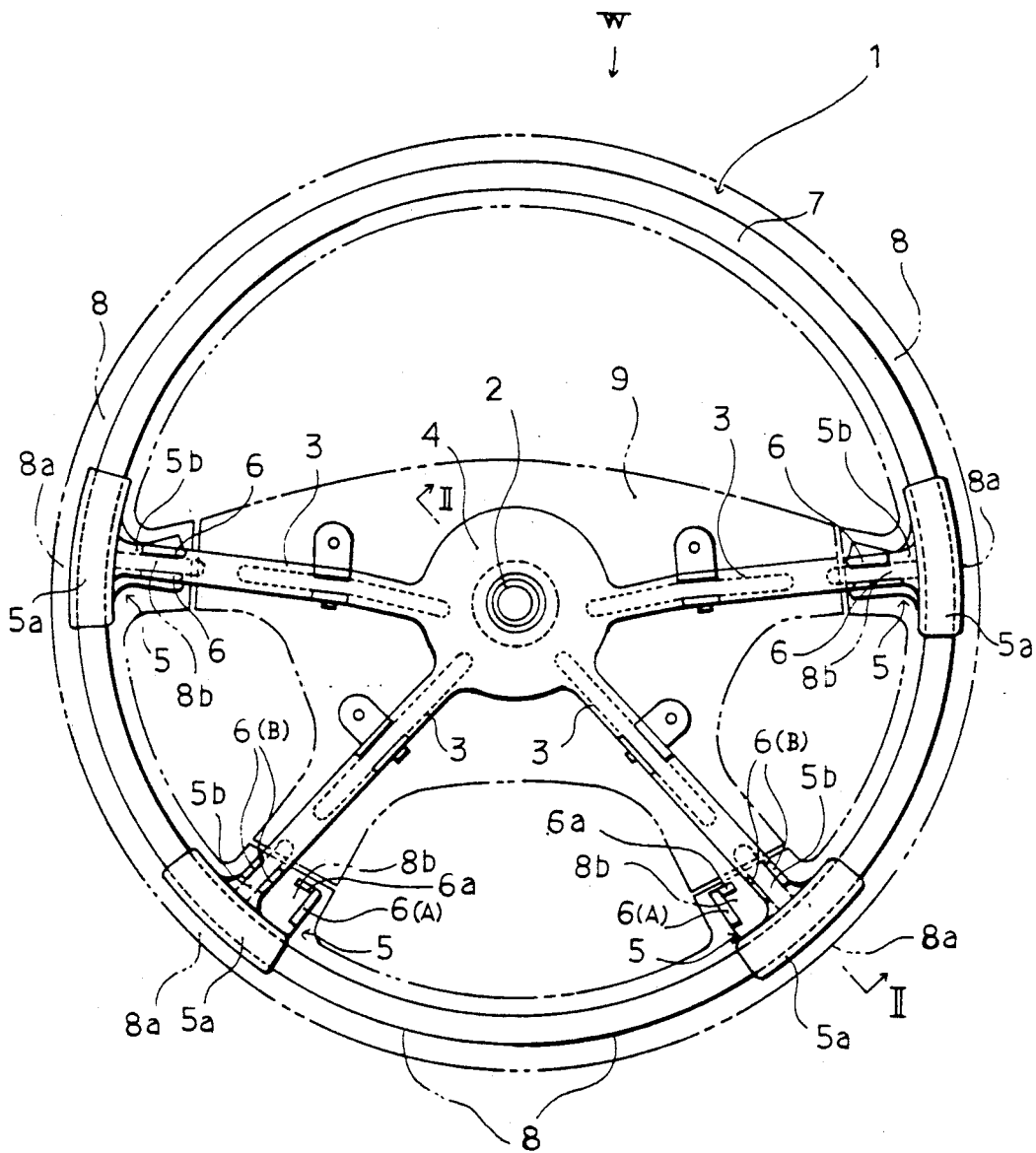
FIG. 1 is a plan view of a steering wheel, illustrating a first embodiment of the present invention.
Figure 2:
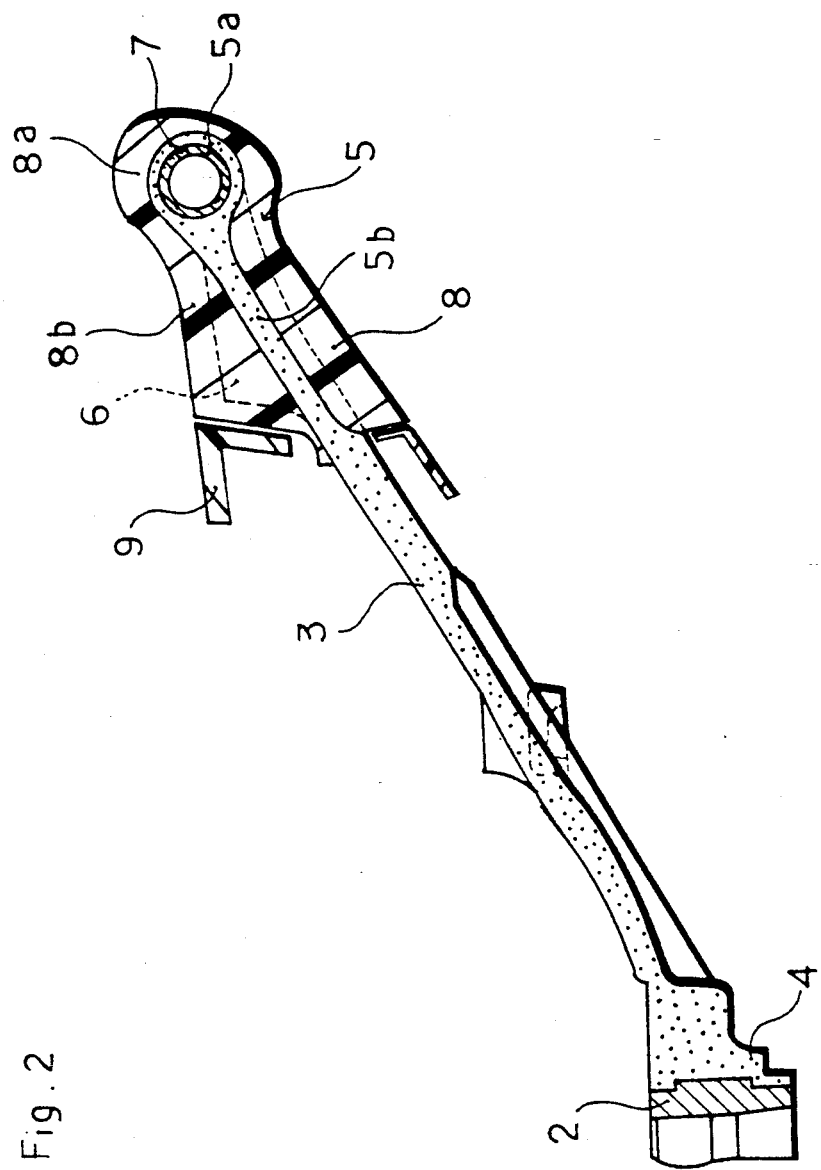
FIG. 2 is an enlarged sectional view substantially along the line II—II of FIG. 1, depicting the principal portion of the first embodiment.
Figure 3:
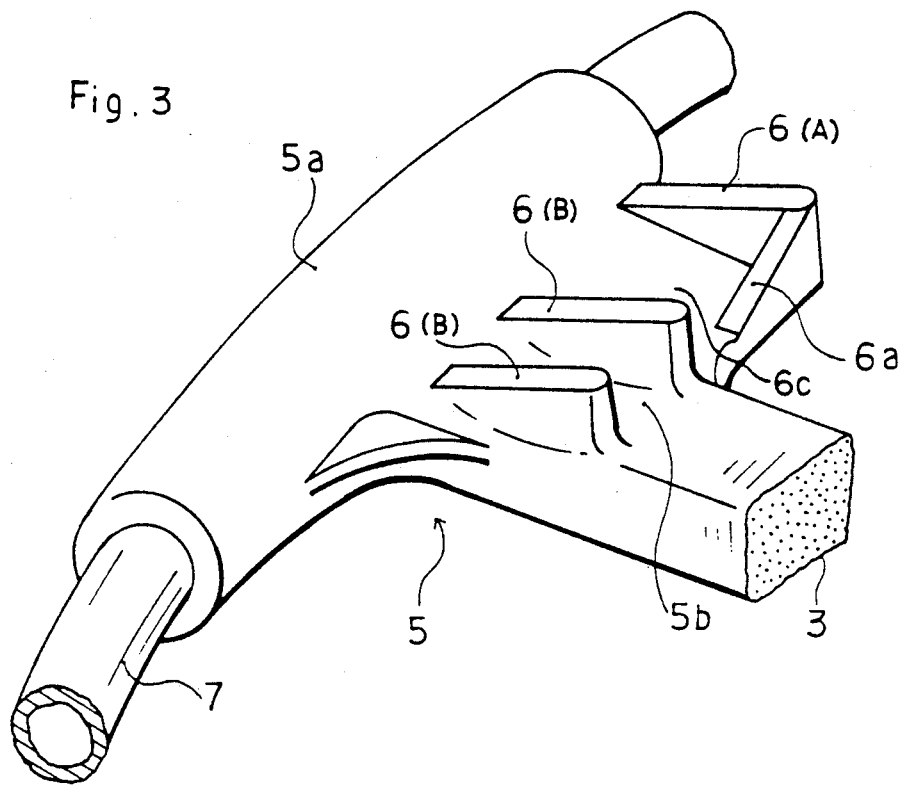
FIG. 3 is a perspective view depicting end portions for connecting spoke core pieces behind them to a ring core piece in the first embodiment.

Turning first to FIGS. 1 to 3, a steering wheel core generally designated at 1 in a steering wheel W in accordance with a first embodiment includes four spoke core pieces 3 formed of die casting metal such as an aluminum alloy, a magnesium alloy, or the like, and disposed between a steel boss 2 and a ring core piece 7 made as a steel pipe.

Each of spoke core pieces 3 includes a connecting part 4 wrapped integrally around the periphery of the boss 2 during the course of casting, on their boss 2 side, and also a end portion 5 wrapped integrally around the periphery of the ring core piece 7 during the course of casting, on their ring 7 side. Spoke core pieces 3 are each, as depicted in FIG. 2, inclined downwards from the ring core piece 7 to boss 2.

Steering wheel W is also arranged such that a coating layer 8 formed of flexible synthetic resin such as flexible urethane, flexible polyvinyl chloride or the like by an injection molding process (including reaction molding). Coating layer 8 covers the surface of ring core piece 7 as well as spoke core ends 5b of end portions 5. Coating layer 8 has layer segments 8b provided upwardly of spoke core ends 5b, layer segments 8b being so formed thick (see FIG. 2) with approach to boss 2 as to make their upper surfaces substantially horizontal, as in the prior art, to obtain integral appearance with the upper surface of a pad 9 disposed over boss 2.

On the upper surface of each spoke core end 5b of end portion 5, two pieces of protrudent ribs 6 are provided on the front spoke core piece 3, while the rear spoke core piece 3 is provided with three pieces of ribs 6 in the longitudinal direction of spoke core piece 3. Ribs 6 are shaped simultaneously when forming spoke core piece 3, connecting part 4 and end portion 5 by die casting. The upper surface of each rib 6 is made substantially horizontal (see FIGS. 2 and 3) so that a thickness of a coating layer segment 8a of a ring core segment 5a of end portion 5 is roughly equal to a thickness of a layer segment 8b of spoke core end 5b of end portion 5 above rib 6.

Note that rib 6 in this embodiment has a thickness of approximately 3.5 mm, a front spacing between ribs 6 is set to approximately 5 mm, and rear spacing therebetween is about 5 or 8 mm.

Accordingly, in the case of manufacturing steering wheel W by shaping layer 8 based on the injection molding by use of steering wheel core 1, layer segments 8b, which have been formed on the upper surfaces of spoke core ends of end portions 5, make an attempt to shrink. The shrinkage thereof is, however, regulated by ribs 6, thereby preventing generation of weld and sink marks in layer segments 8b. Coating layer 8 is formed by injecting a molding material from the ring part or the spoke end portions of steering wheel W. Ribs 6 capable of preventing the sink marks or the like from being produced in layer segments 8b are formed integrally with end portions 5 made of the die casting metal when manufacturing steering wheel core 1. With this arrangement, it is feasible to produce steering wheel core 1 without requiring much labour, even in a case where ribs 6 are provided. Ribs 6 are formed in the longitudinal directions of spoke core pieces 3. More specifically, when forming the spoke core pieces 3 including connecting part 4 and end portion 5 by die casting, the molten die casting metal flows in the longitudinal directions of spoke core pieces 3 in places where spoke core ends 5b of end portions 5 are shaped, which facilitates the flowage within rib molding recesses of a molding die. As a result, ribs 6 can be shaped with no gas pocket, and there is caused no drawbacks to production of the steering wheel core itself.

The forming of steering wheel core 1 by die casting involves a step of injecting the molten die casting metal from connecting parts 4.

Steering wheel core 1 in the first embodiment is arranged in such a manner that ribs 6A provided inwardly of respective end portions 5 of rear spoke core pieces 3 are defined on a projecting plate 6C and are slightly offset from spoke core pieces 3. Hence, it is supposed that a flow of the molten die casting metal is a little bit deteriorated as compared with other ribs 6B. However, as depicted in FIG. 3, tabular reinforcing ribs 6a each assuming a triangular configuration are formed towards spoke core pieces 3. For this reason, the die casting metal is allowed to flow with no obstacle into inner ribs 6A along reinforcing ribs 6a, thereby readily shaping inner ribs 6A together with reinforcing ribs 6a.

The reason why ribs 6A are offset from spoke core pieces 3 may be clarified by the arrangement for reinforcing layer segments 8b, for preventing the generation of sink marks or the like in layer segments 8b when forming layer segments 8b, even in a case where layer segments 8b each having a breadth remarkably greater than that of spoke core piece 3 is to be formed. In this case, ribs 6A which have been offset have no problems in terms of strength, because reinforcing ribs 6a are provided.

Furthermore, in the steering wheel core 1 in accordance with the first embodiment, after disposing coating layer 8 formed of flexible synthetic resin, the thickness of each layer segment 8b provided upwardly of rib 6 is substantially equal to that of each layer segment 8a of the ring core segment, with the result that an almost uniform feeling can be obtained when grasping each portion on which coating layer 8 is covered. It is thus possible to ameliorate the feeling when performing the steering operation.

Figure 5:
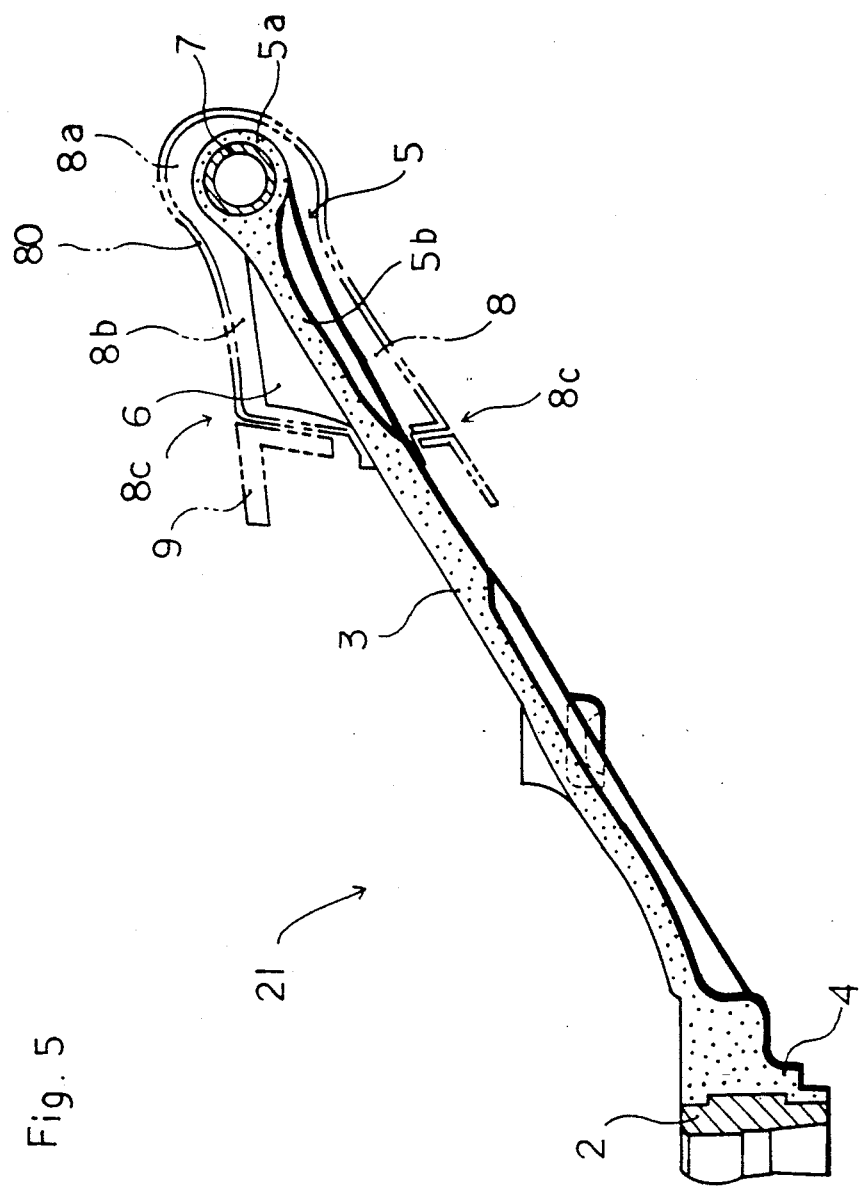
FIG. 5 is a sectional view of the steering wheel core, showing still another embodiment of the invention.

Besides, after flexible synthetic resin layer 8 has been disposed, as illustrated in FIG. 5, a leather 80 such as a genuine or synthetic leather is sewed on a steering wheel 21, thus providing the leather wrapped steering wheel. In this case, the following advantages will be given. To be specific, ribs 6 are incorporated into layer segment 8b covering spoke core segments 5b of end portions 5, which arrangement permits a considerable degree of shape-retaining property of layer segments 8b. It is also feasible to prevent such sagging as to form a large arc surface at an angular portion of layer segment 8b when sewing leather 80 as well as causing no decline in external appearance of leather-wrapped steering wheel 21.

Figure 4:
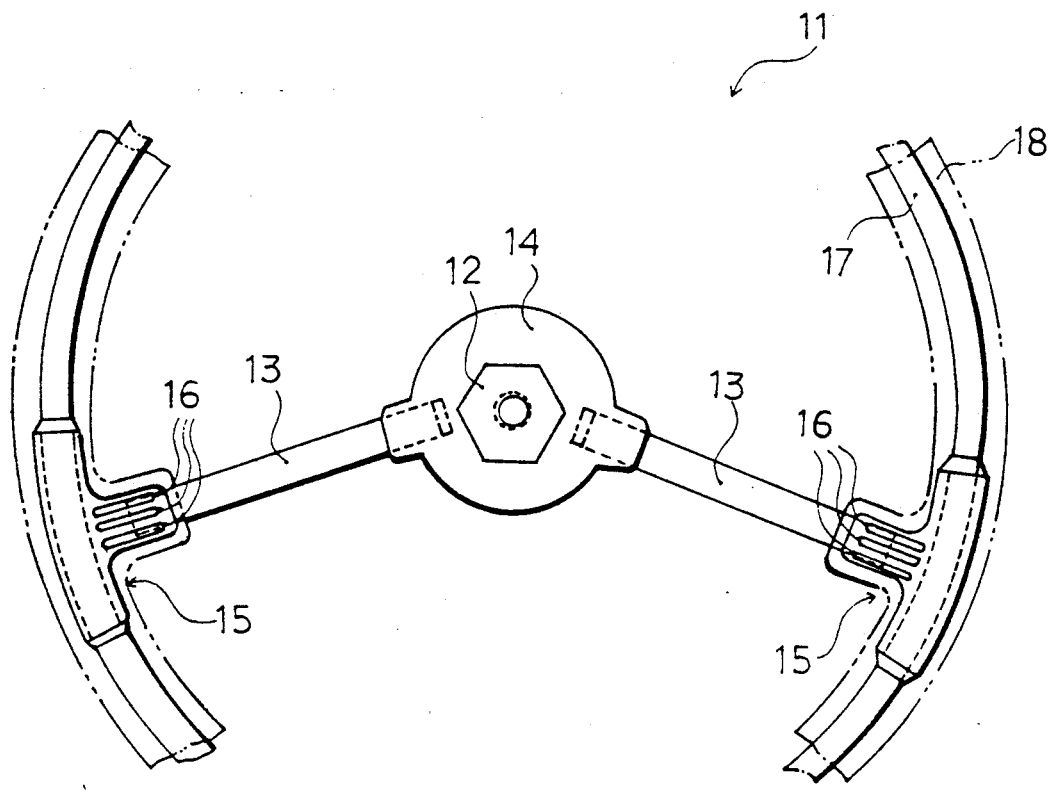
FIG. 4 is a plan view of a steering wheel core, depicting a second embodiment of the invention.

It is to be noted that in the steering wheel core 1 in accordance with the first embodiment, there has been exemplified spoke core pieces 3 formed of the die casting metal. As in the case of steering wheel core 11 shown in FIG. 4 relative to the second embodiment, spoke core pieces 13 may be made of a steel, aluminum plate, or the like, and both ends of each spoke core piece 13 are connected through connecting parts 14 and end portions 15 to boss 12 and to a ring core piece 17. When end portions 15 are formed by die casting, ribs 16 may be shaped on end portions 15.

Steering wheel core 1 in the first embodiment is arranged such that a thickness of each rib 6 is set to an approximately 3.5 mm, and a spacing between ribs 6 in some 5 or 8 mm. However, if rib 6 becomes thin excessively, the rib will lack strength. Whereas with an excessively thick rib, the gas pockets are easily present therein. For this reason, the rib thickness is preferably about 2 to 5 mm. A too-large spacing between ribs 6 results in the occurrence of sink marks on the like in layer segments 8b. Whereas at a too-small spacing therebetween, mold release characteristics will decline, and the feeling will also be deteriorated when grasping the layered portions with hands. Hence, the spacing between ribs 6 is desirably some 4 to 12 mm.

In the illustrative embodiments given above, there has been exemplified coating layers 8 and 18 each formed of flexible synthetic resin. Coating layers 8 and 18 may be made of hard synthetic resin such as polypropylene acethylcellulose or the like.

Figure 6:
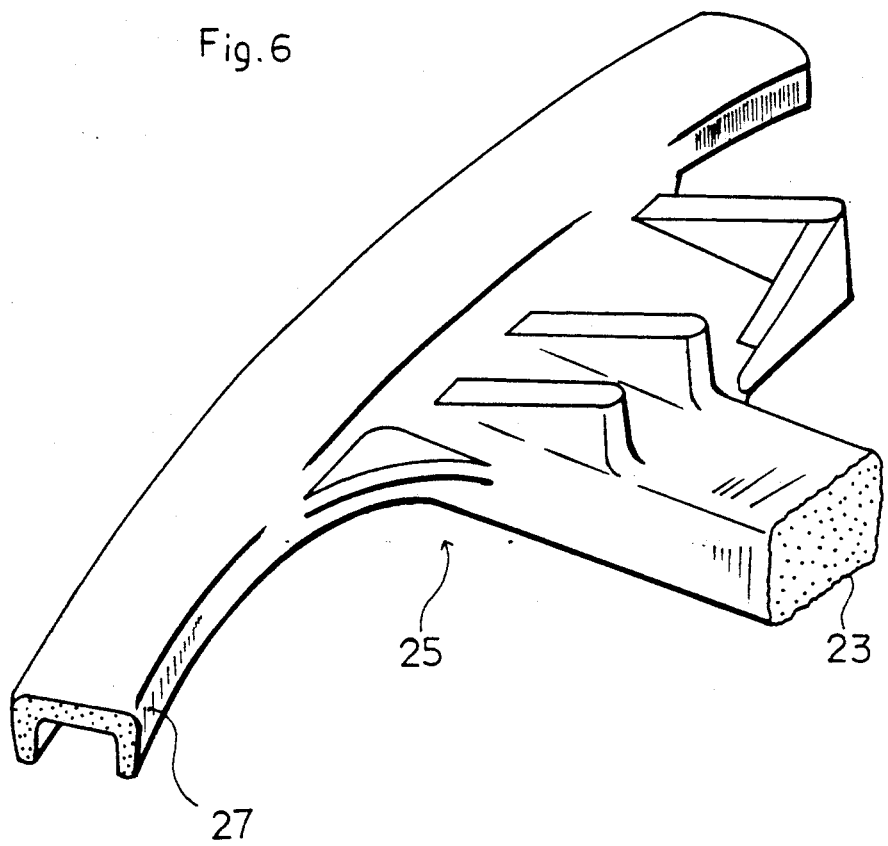
FIG. 6 is a perspective view of the end portions between the spoke core pieces and the ring core piece in the steering wheel core, showing a further embodiment of the invention.

In the above-described embodiments, there have been shown end portions 5 and 15 in combination with ring core pieces 7 and 17 which are provided separately therefrom. The present invention can, however, be applied to a steering wheel in which, as depicted in FIG. 6, a core piece 27 may be formed integrally with spoke core pieces 23 as well as with end portions 25 by employing the die casting metal.

Although the illustrative embodiments of the present invention have been described in greater detail with reference to the accompanying drawings, it is to be understood that the invention is not limited to those precise embodiments. Various changes or modifications may be effected therein by one skilled in the art without departing from the scope of the spirit of the invention.

What is claimed is:

1. A steering wheel comprising:
   (a) a steering wheel core having a ring core piece, a boss, and spoke core pieces having end portions engaging said ring core piece, said end portions each being made from die cast metal, at least one of said end portions having a projecting plate which is laterally offset from said respective spoke core piece;
   (b) a coating layer for covering said ring core piece and said end portions;
   (c) a plurality of ribs formed integrally with said end portions, at least some of said plurality of ribs being defined in planes which are disposed substantially parallel to a longitudinal direction of said respective spoke core piece and parallel to one another, said ribs each having a substantially triangular configuration and projecting upwardly from said end portions for preventing weld marks and sink marks on said coating layer, at least two of said ribs being formed integrally with each said projecting plate, one of said at least two ribs being substantially parallel to said longitudinal direction of said respective spoke core piece and that other of said at least two ribs extending from said one rib towards said respective spoke core piece; and
   (d) a pad for covering said boss.

2. A steering wheel as in claim 1, wherein said spoke core pieces are each made from die cast metal.

3. A steering wheel as in claim 1, wherein said ring core piece and said spoke core pieces are integrally formed from die cast metal.

4. A steering wheel as in claim 1, wherein each of said ribs has a thickness of between about 2 and about 5 mm and wherein said ribs of said plurality of ribs are spaced apart by a distance of between about 4 and about 12 mm.

5. A steering wheel as in claim 1, wherein said ribs have upper surfaces which are defined in a plane substantially parallel to respective surfaces of said coating layers covering said end portions.

6. A steering wheel as in claim 1, wherein said coating layer is covered by a covering member.

* * * * *